United States Patent [19]
McLean

[11] Patent Number: 5,158,500
[45] Date of Patent: Oct. 27, 1992

[54] PRIMARY DRIVE LINE AND COUPLING FOR AGRICULTURAL IMPLEMENTS

[75] Inventor: Kenneth W. McLean, New Holland, Pa.

[73] Assignee: Ford New Holland, Inc., New Holland, Pa.

[21] Appl. No.: 670,641

[22] Filed: Mar. 18, 1991

[51] Int. Cl.⁵ ............................................ B60K 17/28
[52] U.S. Cl. .................................................. 180/53.1
[58] Field of Search ................... 180/53.1, 53.3, 53.6, 180/53.62, 53.8, 14.4, 14.7

[56] References Cited

U.S. PATENT DOCUMENTS

| | | | |
|---|---|---|---|
| 1,889,600 | 11/1932 | Hansen | 180/14.4 |
| 3,557,892 | 1/1971 | Burrough | 180/14.1 |
| 4,033,518 | 7/1977 | Fleming et al. | 180/53.1 |
| 4,184,558 | 1/1980 | de Buhr et al. | 180/53.1 |
| 4,738,461 | 4/1988 | Stephenson et al. | 180/14.4 |

FOREIGN PATENT DOCUMENTS 0108592  9/1939  Australia ............... 180/14.4

OTHER PUBLICATIONS

"Machine Design", The Penton Publishing Co. Section 8, pp. 144–145, Jun. 17, 1971.

Primary Examiner—Margaret A. Focarino
Assistant Examiner—Paul Dickson
Attorney, Agent, or Firm—Larry W. Miller; Frank A. Seemar

[57] ABSTRACT

A drawbar of a tractor is coupled to a tongue of an implement such as a mower conditioner. A primary drive line is connected between a power-take-off shaft on the tractor and an input shaft on the implement to deliver power from the tractor to the implement. The primary drive line includes a telescoping drive shaft with a constant velocity joint at one end for connection to the tractor power-take-off shaft. Another constant velocity joint at the other end of the telescoping drive shaft is adapted for connection to the implement input shaft. An extension is attached to the implement tongue at an angle thereto, and a hitch pin pivotally connects the extension to the tractor drawbar. The hitch pin defines a pivot point for the implement tongue.

4 Claims, 3 Drawing Sheets

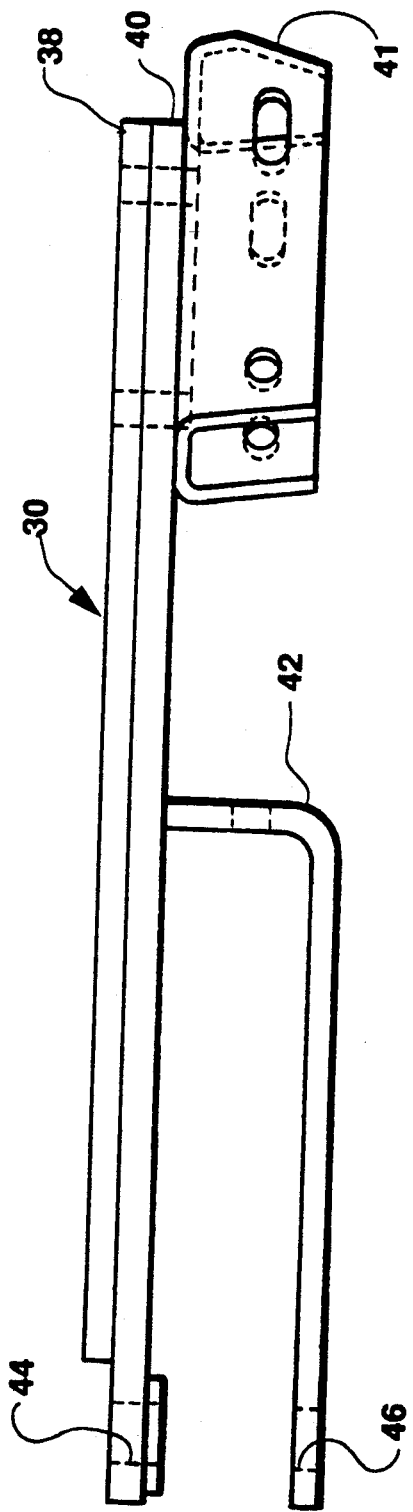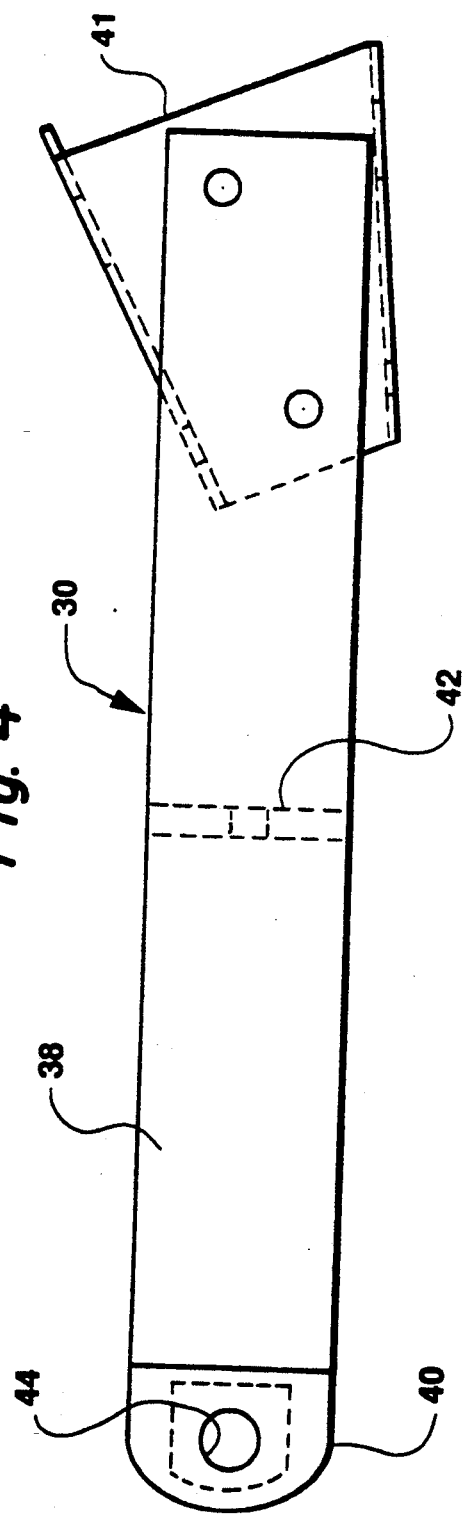

5,158,500

PRIMARY DRIVE LINE AND COUPLING FOR AGRICULTURAL IMPLEMENTS

BACKGROUND OF THE INVENTION

This invention relates generally to agricultural machines and, in particular, to a primary drive line and coupling for agricultural implements.

Farm tractors have a power-take-off (pto) shaft which delivers power to implements such as mower conditioners by utilizing a primary drive line consisting of a telescoping shaft with a universal joint at each end. One of the universal joints is connected to the pto shaft of the tractor while the other universal joint is connected to an input shaft on the implement. A drawbar on the tractor is pivotally connected to a tongue on the implement by a hitch pin. During operation, it is often necessary to maneuver the implement by turning the tractor from side to side. This results in the primary drive line, which delivers power from the tractor to the implement, being disposed at a first joint angle relative to the tractor pto shaft and at a second joint angle relative to the implement input shaft. If the difference between these joint angles is too great, torsional vibration will be transmitted through the primary drive line from the tractor to the implement.

U.S. Pat. No. 3,557,892 to Burrough discloses an equal angle hitch designed to maintain the primary drive line at equal joint angles with respect to the tractor pto and the implement input shaft. The equal angle hitch consists of an extension which is mounted on the tractor drawbar in order to locate the hitch pin pivotally connecting the tractor drawbar and the implement tongue at an equal distance from (i.e. exactly halfway between) the universal joints at the ends of the primary drive line. Even when the equal angle hitch of the Burrough patent is used, it is difficult to maintain equal joint angles.

Swivel hitches such as disclosed in U.S. Pat. No. 4,738,461 to Stephenson et al have been designed to overcome the difficulty encountered with the equal angle hitch of the Burrough patent. The Stephenson et al swivel hitch consists of two right angle gear boxes coupled together. One of the gear boxes is connected to the tractor pto shaft while the other gear box is connected to the implement input shaft. Although swivel hitches are vibration free, they have a disadvantage in that they are expensive.

SUMMARY OF THE INVENTION

An object of the present invention is to provide a primary drive line and coupling for implements which overcomes the difficulties and disadvantages encountered with equal angle hitches and swivel hitches.

In an arrangement according to the present invention, a drawbar on a tractor is coupled to a tongue on an implement. A primary drive line is connected between a power-take-off shaft on the tractor and an input shaft on the implement for delivering power from the tractor to the implement. The primary drive line comprises a drive shaft with a first constant velocity joint at a forward end thereof for connection to the tractor power-take-off shaft and with a second constant velocity joint at a rearward end thereof for connection to the implement input shaft. An extension is attached to the implement tongue at an angle with respect to the implement tongue, and a hitch pin pivotally connects the extension to the tractor drawbar. The hitch pin defines a pivot point for the implement tongue. This pivot point is located substantially closer to the first constant velocity joint than to the second constant velocity joint.

DESCRIPTION OF THE DRAWINGS

FIG. 3 is a side view of one part of the present invention taken on lines 3—3 of FIG. 1; and FIG. 4 is a top plan view of the part shown in FIG. 3.

DESCRIPTION OF THE PREFERRED EMBODIMENT

Figure 1:
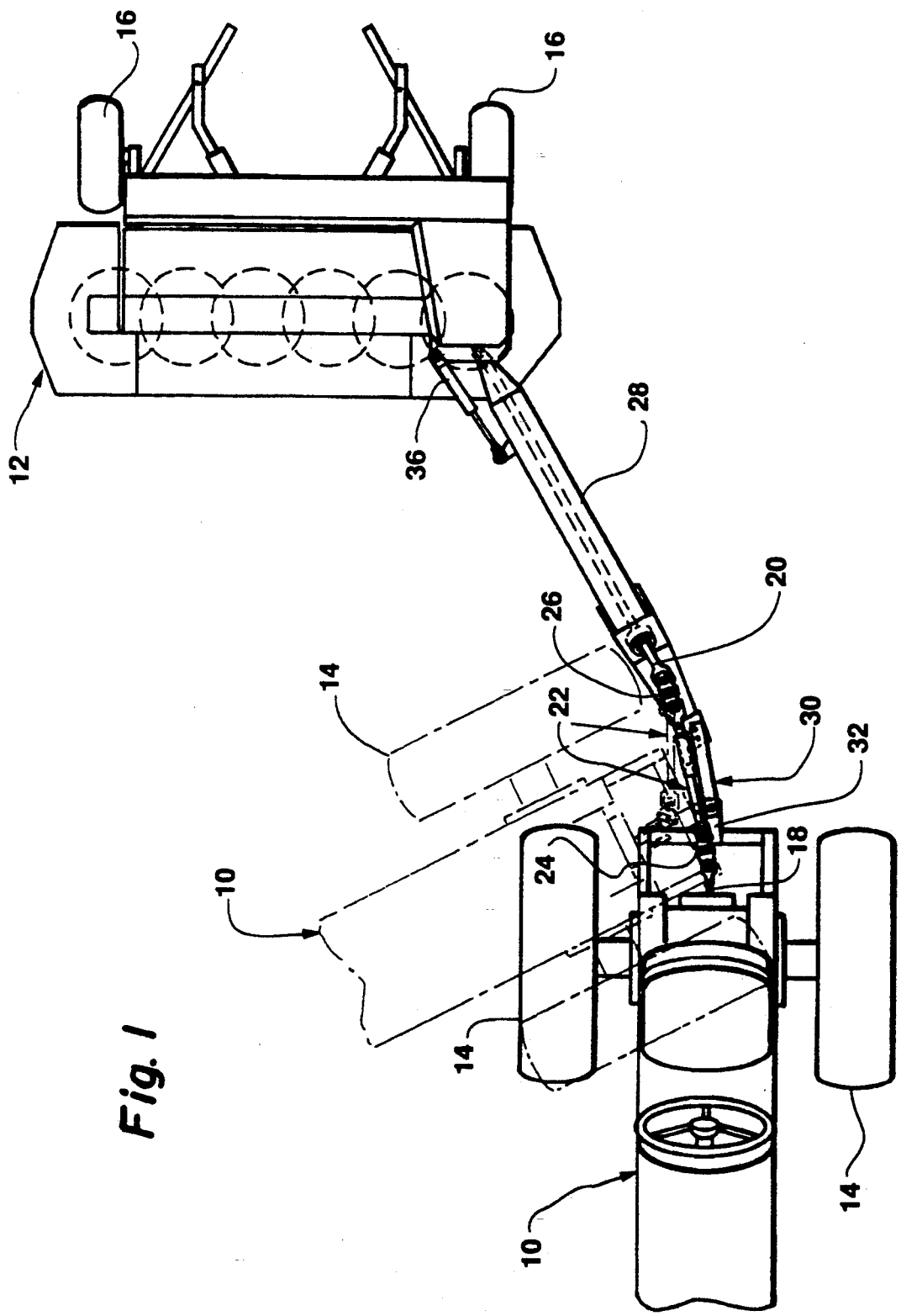
FIG. 1 is a top plan view of a tractor coupled to an implement in accordance with the present invention.
Figure 2:
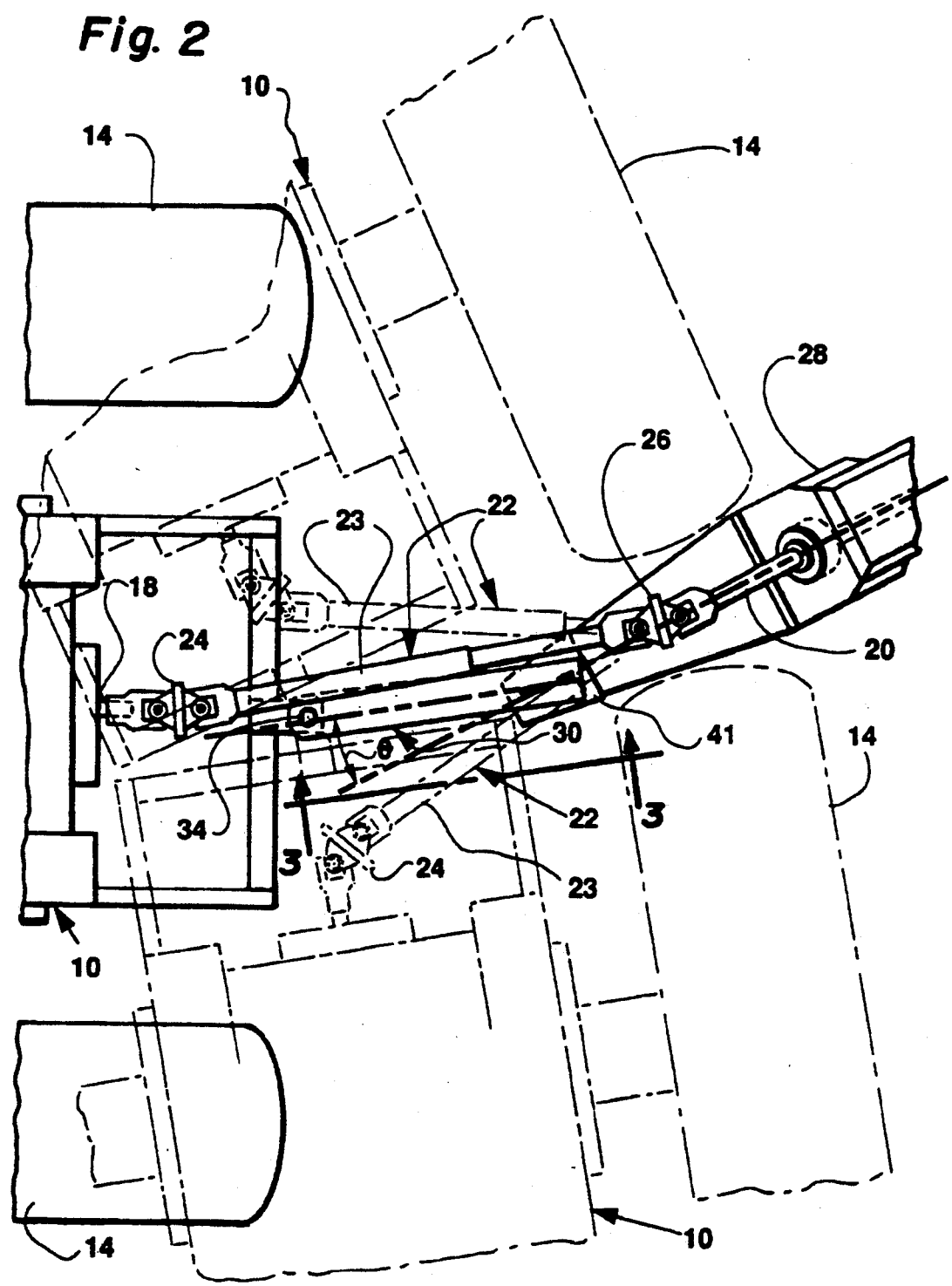
FIG. 2 is an enlarged top plan view of the present invention.

Referring to FIGS. 1 and 2, a tractor 10 is coupled to an implement 12 such as a mower conditioner. The tractor 10 has a pair of rear wheels 14, and the implement 12 has a pair of wheels 16. A power-take-off (pto) shaft 18 on the tractor 10 is connected for delivering power to an input shaft 20 on the implement 12 by a primary drive line 22 which includes a drive shaft 23 with constant velocity joints 24 and 26 at the forward and rearward ends, respectively, thereof. Constant velocity joint 24 is connected to the tractor pto shaft 18, and constant velocity joint 26 is connected to the implement input shaft 20 to define a straight line between the constant velocity joint 24 and the constant velocity joint 26 corresponding to the drive shaft 23. The drive shaft 23 has two telescoping sections 22a, 22b, and the constant velocity joints 24, 26 are of a conventional type such as part no. 9624202 sold by Walterscheid Agmaster, Inc. Constant velocity joint 24 is connected to the tractor pto shaft 18, and constant velocity joint 26 is connected to the implement input shaft 20.

A tongue 28 has one end pivotally mounted to the implement 12, and an extension 30 is fastened by bolts or welding to the other end of the tongue 28 at an angle $\theta$ of approximately 20 degrees with respect to the tongue 28. Alternatively, the extension 30 may be formed as a unitary portion of the implement tongue 28 rather than as a separate part that is attached to the tongue 28. The extension 30 is pivotally connected to a drawbar 32 on the tractor 10 by a hitch pin 34. A hydraulic cylinder 36 is mounted between the implement 12 and the tongue 28 to swing the implement 12 from an operating position shown in FIG. 1 and to a transport position (not shown) where the implement 12 is disposed directly behind the tractor 10. The angular relationship between the tongue 28 and the extension 30 allows the implement 12 to make tighter turns to the right when it is in the operating position.

Extension 30 has been designed to locate a pivot point (i.e. hitch pin 34) for the implement tongue 28 far enough forward in the normal direction of travel to accommodate the primary drive line 22. As seen in FIGS. 3 and 4, extension 30 consists of two plates 38 and 40 that are welded together and then bolted to a bracket 41 which is bolted to the tongue 28. Another plate 42 is welded to the plate 40. Plates 40 and 42 are spaced apart to receive the tractor drawbar 32 therebetween, and they have aligned holes 44, 46 for receiving the hitch pin 34.

With the extension 30 installed, the tractor 10 may make full turns to the right or to the left as shown in dashed lines in FIG. 2 with no interference from the primary drive line 22. This is because the pivot point (i.e. hitch pin 34) for the implement tongue 28 is located sufficiently forwardly in the normal direction of travel to prevent the telescoping drive shaft 23 from bottoming out when the tractor 10 is turned from side to side. The pivot point for the implement tongue 28 that is defined by the hitch pin 34 is located substantially closer to the constant velocity joint 24 than to the constant velocity joint 26.

When the tractor 10 is turned to the right or to the left, the constant velocity joints 24, 26 have joint angles which are not equal. In other words, the drive shaft 23 is disposed at a first joint angle relative to the tractor pto shaft 18 and at a second joint angle relative to the implement input shaft 20, the first and second joint angles being unequal. Any torsional vibrations that may be caused by this inequality between the first and second joint angles are canceled by the constant velocity joints 24, 26. In the arrangement shown in FIG. 2, the first joint angle varies from 0 degrees to approximately 67 degrees while the second joint angle varies from 0 degrees to about 30 degrees. Constant velocity joints 24, 26 are capable of handling joint angles up to 80 degrees.

It will be understood that the primary drive line 22 of the present invention operates as smoothly and vibration free as the swivel hitch disclosed in U.S. Pat. No. 4,738,461 but is significantly less expensive than this swivel hitch. The primary drive line 22 also eliminates the problem of maintaining equal joint angles that is encountered when using the equal angle hitch disclosed in U.S. Pat. No. 3,557,892.

What is claimed is:

1. In an arrangement including a drawbar on a tractor coupled to a pivotable tongue on an implement, a primary drive line connected between a power-take-off shaft on the tractor and an input shaft on the implement for delivering power from the tractor to the implement, an improvement wherein:

said primary drive line comprises a drive shaft with a first constant velocity joint at a forward end thereof for connection to the tractor power-take-off shaft and with a second constant velocity joint at a rearward end thereof for connection to the implement input shaft, said drive shaft and said first and second constant velocity joints being positioned between said tractor and said implement tongue;

said implement tongue has an extension attached thereto at an angle with respect to said implement tongue; and a hitch pin pivotally connects said extension to the tractor drawbar, said hitch pin defining a pivot point for said implement tongue, said pivot point being located between said first and second constant velocity joints, but substantially closer to said first constant velocity joint than to said second constant velocity joint, said drive shaft maintaining a straight line between said first and second constant velocity joints passing over said hitch pin.

2. In the arrangement of claim 1, wherein said drive shaft comprises at least two telescoping sections.

3. An arrangement comprising:

a drawbar on a tractor coupled to a pivotable tongue on an implement;

a primary drive line connected between a power-take-off shaft on the tractor and an input shaft rotatably supported by the implement tongue for delivering power from the tractor to the implement;

said primary drive line including a first constant velocity joint at one end thereof for connection to the tractor power-take-off shaft and a second constant velocity joint at the other end thereof for connection to the implement input shaft;

an extension attached to the implement tongue at an angle with respect to the implement tongue; and a hitch pin pivotally connecting said extension to the tractor drawbar, said hitch pin defining a pivot point for said implement tongue, said pivot point being located substantially closer to said first constant velocity joint than to said second constant velocity joint, said primary drive line maintaining a straight line between said first and second constant velocity joints passing over said hitch pin.

4. The arrangement of claim 3, wherein said angle is approximately 20 degrees.

* * * * *